Oct. 1, 1935.  W. W. ODELL  2,015,689

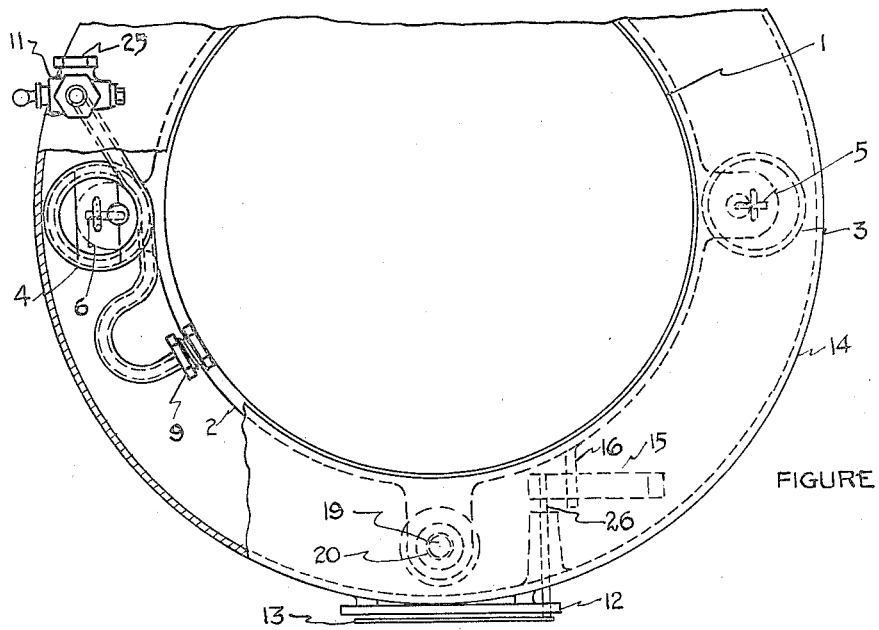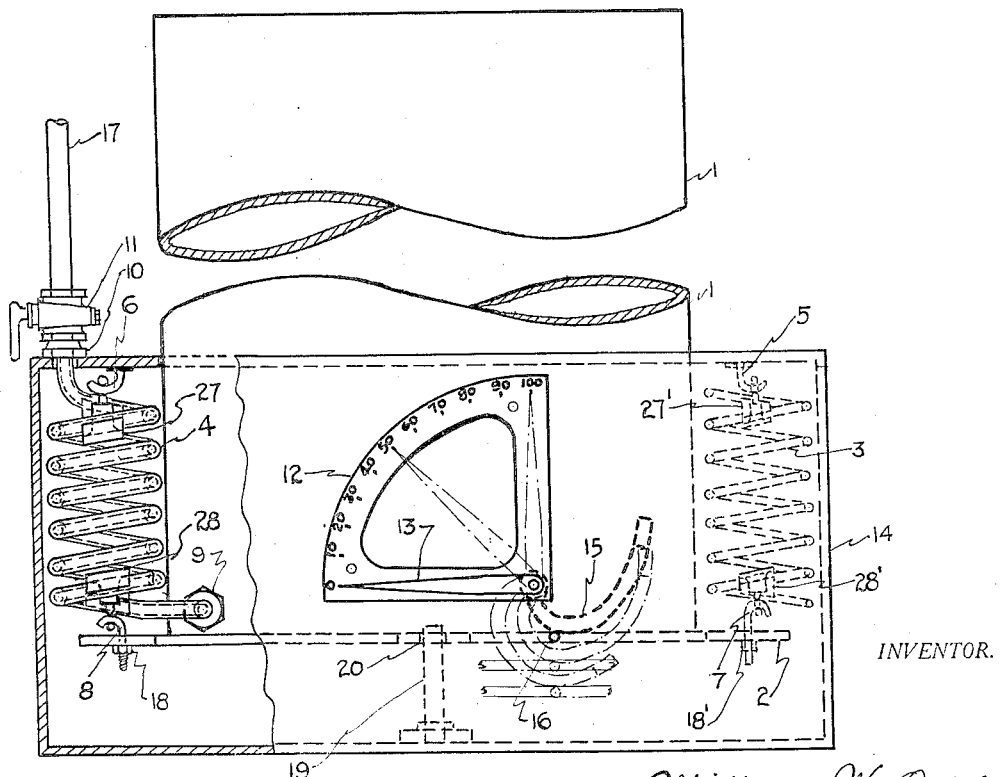

APPARATUS FOR DISPENSING LIQUIDS

Filed July 29, 1932   2 Sheets—Sheet 2

INVENTOR.
William W. Odell

Patented Oct. 1, 1935

2,015,689

UNITED STATES PATENT OFFICE 2,015,689

APPARATUS FOR DISPENSING LIQUIDS

William W. Odell, New York, N. Y., assignor of one-half to Henry Rosenthal, New York, N. Y.

Application July 29, 1932, Serial No. 626,049

6 Claims. (Cl. 73—54)

My invention relates to a means and method of dispensing liquid fuels for domestic use from containers that require occasional refilling; in particular it relates to means for charging said containers and for gauging the liquid contents thereof, but is not limited to this use.

In the distribution of liquid fuels such as "bottled gas", that is, liquid propane, butane, pentane, or other liquid fuel under superatmospheric pressure, it is difficult under prevailing conditions to determine the amount of liquid in a partly filled (partly emptied) tank, or in a full or empty tank. Gage glasses are not used on account of fire hazard. So far as I am aware, no simple means or method has been developed prior to my invention for attaining this result. One method now in common use consists in weighing each tank, commonly called "bottle", to determine the liquid contents. Frequently this necessitates repetition of weighings at appreciable expense in order to maintain the proper fuel supply in the storage container.

Another system removes containers after the fuel supply is exhausted, replacing them with filled ones. This necessitates cartage on both the empty and filled containers as well as a large supply of containers.

Attempts have been made to charge storage tanks with propane and butane by elevating them on a balance, commonly a tripod scale and a hose connection is made whereby the fluid is forced into the container. Accurate weighing is impossible under these conditions because the weight of a portion of the hose is included and because the connecting pipes leading to the appliances prevent accurate balancing of the tank.

My invention is directed to the elimination of the defects in the dispensing systems which are now in use and which I have briefly described.

One of the objects of my invention is to eliminate the necessity of removing empty containers and replacing them with filled containers.

A second object of my invention is to make possible the determination of the liquid contents of a container and at the same time eliminate inaccuracies due to inlet and outlet connections affecting the mechanism.

A third object of my invention is to make it possible to ascertain visually the liquid contents of a container "in situ" without the use of gauge glasses. Other objects will become apparent from this disclosure.

I find that it is desirable to provide means whereby the dispensing tank (bottle) which is the domestic consumer's storage tank, may be filled without removing it from its base support, and in some cases filled while fuel is being withdrawn therefrom; such means I provide in my invention.

In my device the container is supported by an elastic member which permits movement of the container as the volume and consequently the weight of the liquid in the container changes. At least one of these elastic members which support the container is hollow and serves as a means of charging and discharging liquid to and from the container. One end of this hollow elastic member is substantially fixed relative to the container and the other end of this hollow elastic member is substantially fixed relative to the base or primary supporting means. In this manner by the use of a proper system of scales, dials and indicating mechanism, the contents of the container can easily be determined and the pipe connections from the charging and discharging system do not affect the accuracy of the determinations. This result is not obtained in any other apparatus with which I am familiar, for dispensing liquids.

The device is particularly adapted for liquid fuels having a vapor pressure greater than one atmosphere such as propane, butanes, pentane, propylene, butylene, ether, mixtures of them and similar highly volatile fuels. It is not limited to use with the highly volatile fluids however, because with a suitable vacuum system or when gas pressure is otherwise provided the invention is applicable in dispensing other fluids such as kerosene, pentane, gasoline, benzol, alcohols, ethers and other similar fuels. A vacuum tank or the equivalent is not shown because neither is claimed as such nor as my own invention. Furthermore, it is not limited to the dispensing of fuels but is equally applicable to the dispensing of other liquids.

I believe that it is basically new to suspend or support a liquid-dispensing container by a hollow spring coil through which the liquid to be dispensed passes enroute from the container. I also believe it is new to combine a weight-indicator with a suspended container particularly in a fuel-dispensing system.

I find that the use of the hollow spring coil both for supporting the container and as a conduit-offtake for the liquid is advantageous because of simplicity of construction, low cost, ease of filling with simultaneous accurate determination of the contents of said container.

It is believed to be patentably new to employ a suspended container, movably suspended on a spring-tension element or other elastic element for supplying fuel to fuel-burning appliances, and particularly when the movement of said container is the actuating means whereby the contents of the container are made visibly apparent on an indicator.

Somewhat summarily, the advantages claimed for my apparatus may be listed as follows:

(A) The amount of liquid in the container can be ascertained at any time by merely glancing at the indicating pointer; this is accomplished without making any separate connections or disconnection and without moving or lifting the container.

(B) The container can be used simultaneously with the operation of filling it with liquid.

(C) When charging the container the exact amount of liquid is not obscured by the weight of the connecting tube or other connections used for the purpose.

(D) The suspending element or one of the elements, by means of which the container is suspended, may be used also as a conduit offtake for the fluid initially confined in said container.

(E) The container is movably suspended on a spring tension element or other elastic element in such a manner that the pipe line leading away from the container or from the spring-tension element is not caused to move by virtue of movement of said container.

(F) The spring-tension element may be (as shown) a coil which "takes up" the movement of the container occasioned by changes in the weight of the liquid content thereof.

(G) The coil is or may be both a spring and a conduit for the liquid confined in the container.

(H) The pointer is preferably adjustably mounted on its shaft such as by a set screw so that it readily can be set at 0, 100, or elsewhere, in making the initial adjustment of the indicating device.

(I) Uninterrupted service in dispensing the liquid from the container even though the container is being charged.

(J) A ready means is provided, as shown at 18 and 18' in Figure 1, for adjusting the spring tension of the supporting coils.

The operation of my invention may best be described with reference to the following figures which are part of this specification. These figures are diagrammatic and illustrative and my invention is not limited to the particular construction as indicated.

Figure 1 is a diagrammatic elevation of one form of my apparatus, in which a portion of the container for liquid is cut away for the purpose of shortening the drawing; a portion of the base box enclosing the spring mechanism is also cut away for the purpose of clearly showing the tube spring and its connections.

Figure 2 is a plan or top view of the apparatus shown in Figure 1, partly cut away.

Figures 3, 4, 5:
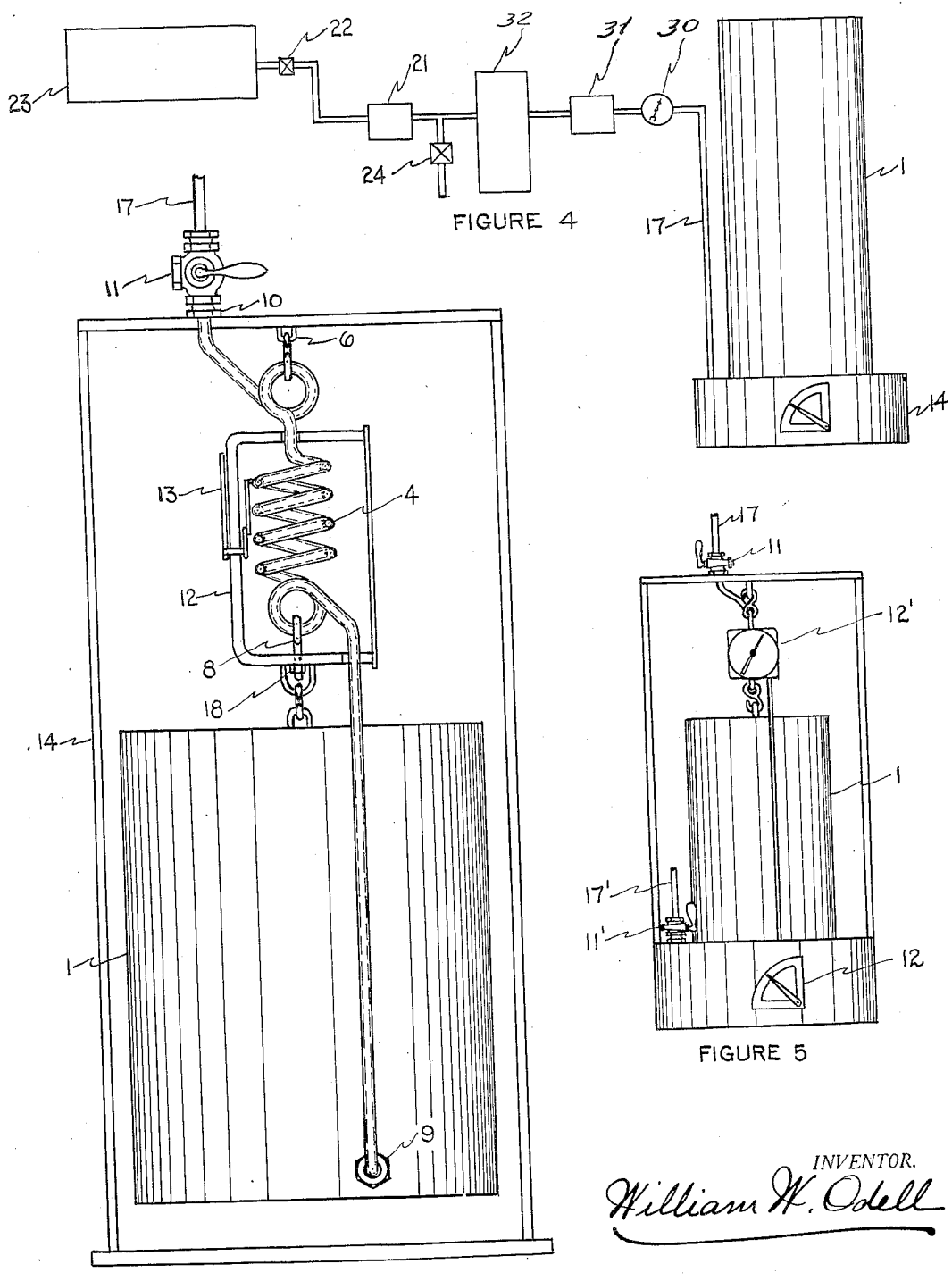

Figure 3 is an elevation, also diagrammatic, of a modified form of my apparatus in which the same invention is applied, the container being supported by suspension from above. Figure 3 is an elevation of one form of my apparatus in which the spring or elastic element is at the top instead of the base. The offtake for fuel is shown at the bottom, but obviously it could be at the top extending part way or substantially all the way to the bottom. In this figure the indicating pointer is directly actuated by link connection with the elastic element 4.

Figure 4 is a diagrammatic sketch of a complete system, showing the container in elevation and symbolically showing the pressure gage, regulators, vaporizer and fuel-burning appliance.

Figure 5 shows a container having the indicating device at both top and bottom.

Referring to Figure 1, the tank or container confining the liquid to be dispensed is shown at 1, mounted on a base 2, supported by springs designated as 3 and 4, which are fastened at the ends, respectively, by hooks 5 and 7 and 6 and 8. Spring 4 is hollow and communicates with the inside of container 1 through the connection 9. One end of the coil 4 is held in a position substantially fixed relative to the fixed support 14 by element 10, the other end of the coil is held in a position substantially fixed relative to container 1, the outlet valve for fluid passing through 4 is at 11. The dial or scale 12 is mounted on base box 14 and has a movable pointer 13 actuated by cam 15 which changes position as the container and base move upwardly or downwardly through the opening and closing movement of the coils 3 and 4. The cam rolls on element 16. The valve 11 is preferably a three-way valve. The offtake conduit 17 leads from valve 11 to fuel-burning appliances. It is common practice to employ a vaporizer, one, or more than one, pressure regulator and sometimes a meter in the pipe line connecting the container with a fuel burning appliance; these are not shown because they are not claimed as such but it is understood that they may be used in this system even though not specifically shown, claimed or described. Outlet 25 on the three-way valve 11 serves as a means of connecting the container to a suitable source of supply for re-filling when necessary. Means for adjusting the spring tension of the coils is shown at 18 and 18'. Clamps 27 and 27' are attached to the upper ends of elastic members 4 and 3, respectively, and by means of these clamps the elastic members are held to the fixed support 14 by the hooks 6 and 5, respectively. Clamps 28 and 28' are attached to the lower ends of elastic means 4 and 3, respectively, and these clamps are in turn connected to the hooks 8 and 7, respectively, carrying the base 2 upon which the tank 1 is mounted. Post 19 is a guide for limiting the direction of motion of container 1. Post 19 slides in an opening 20 in base 2.

The same system of numbering is used throughout the figures. In Figure 4, 30 is a pressure gage, 31 and 21 are pressure regulators, 32 is a vaporizer, 23 is a fuel-burning appliance, 24 is a pressure relief valve while 22 is a valve controlling flow to tank 23.

In Figures 3 and 5 the pipe 17 is suitably connected in a system for dispensing fuel to a fuel-burning appliance, the connections are not shown but in Figure 4 they are indicated diagrammatically.

In Figure 5 the upper indicating device is numbered 12' and the lower one is numbered 12.

Referring to Figures 1 and 2, the operation is as follows: A hose connection or other suitable connection to a supply of liquid to be dispensed is made with valve 11 at opening 25, and that valve is then opened to receive the liquid. The liquid is charged under pressure into 1 through the coil 4 and intake connection 9. The weight of the liquid causes the springs to expand, the container and base piece move downwardly causing the cam to move through the positions shown, the indicating pointer 12 moving from the zero position when the container is empty to the 100 position when it is full—filled to the predetermined "working capacity." During the filling operation when valve 11 is connected through opening 25 to the source of supply, the position of the valve may be such that opening 25 is connected only to the container 1 through the elastic conduit 4, or by turning the cock through 90 degress the container may be filled through opening 25 while at the same time keeping the container connected to the fuel burning appliances through pipe 17. The supply line can then be disconnected from 25 and the supply from container 1 is connected to the fuel supply line 17. The liquid thus confined is drawn out of container 1 as it is required by virtue of pressure in the container, passing through coil 4, the pointer indicating at all times the amount of liquid left in the container, thus indicating to the consumer the amount used and the proper time for re-charging.

This indicating mechanism as shown, operates as follows: As liquid is withdrawn from the tank, the tension on springs 3 and 4 decreases and tank 1 moves upwardly relative to the base 14. At the same time the element 16 which is substantially fixed relative to the tank moves upwardly and moves the cam 15 which rests on element 16 by virtue of the weight of the cam. Cam 15 is fixed to the shaft 26 which in turn is fixed to the pointer 13. Thus, as the element 16 moves upwardly it forces the pointer 13 downward, the cam shaft and pointer operating as a unit. The element 16 will pass through substantially equal vertical distances for equal increments in the amount of liquid withdrawn from or added to the container. In order that the pointer make substantially uniform angular displacements which are required for uniform scale divisions on the circular scale 12 attached to the base 14, it is necessary to employ a particular shaped cam.

The scale 12 may be arbitrarily divided, for instance, as from zero to 100, indicating zero when the tank is empty and 100 when the tank is full, or it may be graduated in pounds, or it may be graduated to indicate gallons. In the latter case some slight adjustments may have to be made if the quality of the fuel dispensed is changed. However, in general these changes will be minor, as propane weighs approximately 4.4 pounds per gallon, and pentane weighs approximately 5.2 pounds per gallon, and in ordinary service on "bottled gas" this represents the greatest variation in density that is likely to be encountered. In some cases it will be more convenient to graduate the scale in equivalent thousand feet of standard city gas. Since propane weighs 4.4 pounds per gallon and each gallon contains 96,000 B. t. u., 5.6 gallons or approximately 25 pounds of propane is equivalent to 1,000 cu. ft. of city gas having a calorific value of 537 B. t. u. per cubic foot. Thus for each 5.6 gallons of propane used, the corresponding markings on the dial would indicate 1,000 cu. ft. of city gas used, the dial being marked to indicate the fractional parts of the thousand cubic feet. In this case as in the case of the dial being marked to indicate gallons, some slight adjustment would have to be made with changes in the quality of the fuel. As an indication of the magnitude of these changes, propane has a heating value of 21,600 B. t. u. per pound and pentane has a heating value of 21,000 B. t. u. per pound.

Means are provided to make necessary adjustments in scale reading. These means comprise adjusting the tension of the elastic members which as shown can be done by movement of the nuts 18 and 18'. Furthermore, I prefer that the pointer 13 be attached to the shaft 26 by a friction connection or similar means whereby the pointer may be set on zero when the tank is empty. Further means of providing adjustment is by changing the effective length of the elastic members. This may be accomplished by changing the position of the clamps 27 and 27' or 28 and 28'.

The hollow coil need not be at the bottom as shown in Figure 1 but may be at the top of the container or at midway points.

I prefer an indicator substantially as shown although I consider that modifications come within the confines of my invention. In the combination shown I prefer to indicate pounds on the dial when the liquid is sold by weight and in liquid measuring units when the liquid is sold by such units.

The coil shown at 3, Figure 1, is not connected with the container nor is it necessarily a hollow coil. However, it may be hollow and connected similarly as coil 4.

It is obvious that similar results may be obtained by similarly suspending the fuel container but removing the fuel through a separate offtake, utilizing the suspension either continuously or only when it is desirable to ascertain the amount of fuel confined. This may be accomplished by providing a resting device such as is in common use on an analytical balance. I believe that my invention is broadly new and a patent is sought on this basis.

The term "spring-tension element" is used in this specification in the broad sense and designates a compression spring as well as a tension spring.

Obviously, many changes may be made without departing from the scope and spirit of my invention, as described and illustrated in these specifications, which are intended only to explain and should not be construed as limiting my invention to the particular construction shown.

Having described my invention so that one skilled in the art can practice it, I claim:

1. A liquid-dispensing system comprising a liquid reservoir supported by an elastic member, having means for charging liquid therein and for discharging it therefrom to a pipe system, said elastic member being a spring-coil conduit adapted for the discharge of liquid from said reservoir to said pipe system and adapted to suspend said reservoir in a position varying with, and by virtue of, variation in the amount of the liquid confined in said reservoir, one end of said conduit communicating with the interior of said reservoir and the other end communicating with the said pipe system.

2. In apparatus of the kind described, the combination of a container for confining and dispensing a fluid, means for introducing a fluid into and withdrawing it from said container comprising a tubular spring which supports said container in weighing relation, and indicating means actuated by variations in the load on said spring for indicating displacement of said container.

3. In apparatus of the kind described, the combination of a container for confining and dispensing fluid, common means for introducing fluid into and withdrawing fluid from said container, said means comprising a tubular spring element supporting said container, one end of said element communicating with the interior of said container and the other end having means for connection with a fluid conduit, and reference means for indicating displacement of said container due to varying weight of fluid therein.

4. In apparatus of the kind described, the combination of a container for confining and dispensing fluid, means for supporting said container for displacement in accordance with variations in the weight thereof comprising a tubular spring, one end of said spring communicating with the interior of said container and the other end being provided with means for connection with a conduit whereby fluid may be introduced into and withdrawn from said container, and scale markings for indicating displacement of said container.

5. In apparatus of the kind described, the combination of a container for confining and dispensing fluid, means for introducing fluid into and for withdrawing it from said container comprising a tubular spring which spring supports said container in weighing relation, one end of said spring communicating with the interior of said container adjacent the bottom thereof, the other end being provided with means for connection with a fluid conduit, and indicating means actuated by displacement of said container indicating the amount of fluid confined in said container.

6. In apparatus of the kind described, the combination of a container for confining and dispensing fluid, means for introducing fluid into said container and for withdrawing it therefrom comprising a tubular spring coil, said spring coil supporting said container in weighing relation, and scale markings for indicating displacement of said container.

WILLIAM W. ODELL.